(12) United States Patent
Hsu (10) Patent No.: US 8,770,539 B1
(45) Date of Patent: Jul. 8, 2014

(54) ELECTRONIC GADGET HOLDER FOR AUTOMOBILES AND TRIPODS

(71) Applicant: Kevin Hsu, La Puente, CA (US)

(72) Inventor: Kevin Hsu, La Puente, CA (US)

( * ) Notice: Subject to any disclaimer, the term of this patent is extended or adjusted under 35 U.S.C. 154(b) by 26 days.

(21) Appl. No.: 13/759,983

(22) Filed: Feb. 5, 2013

(51) Int. Cl.
*A47G 29/00* (2006.01)

(52) U.S. Cl.
USPC ........... 248/688; 248/689; 248/558; 248/126; 248/145.6; 455/569.2; 361/679.56

(58) Field of Classification Search
USPC ................ 248/682, 688, 689, 558, 471, 126, 248/145.6, 168; 455/575.1, 569; 361/679.56
See application file for complete search history.

(56) References Cited

U.S. PATENT DOCUMENTS

| | | | | |
|---|---|---|---|---|
| 153,983 | A * | 8/1874 | Rontey | 248/471 |
| 286,699 | A * | 10/1883 | Hornberger | 248/471 |
| 3,385,551 | A * | 5/1968 | McKay | 248/467 |
| 4,640,481 | A * | 2/1987 | Kohno | 248/126 |
| 6,728,556 | B1 * | 4/2004 | Whitley | 455/575.1 |
| 7,490,797 | B1 * | 2/2009 | Law | 248/163.2 |
| 7,621,491 | B2 * | 11/2009 | Law | 248/163.2 |
| 7,780,126 | B2 * | 8/2010 | Law et al. | 248/168 |
| 8,376,292 | B2 * | 2/2013 | Cicco | 248/176.1 |
| 8,638,557 | B2 * | 1/2014 | Tsai | 361/679.56 |
| 2003/0040285 | A1 * | 2/2003 | Whitley | 455/90 |
| 2009/0084705 | A1 * | 4/2009 | Justiss | 206/724 |
| 2010/0219217 | A1 * | 9/2010 | Andochick | 224/250 |
| 2012/0075799 | A1 * | 3/2012 | Pollex | 361/679.56 |
| 2013/0181584 | A1 * | 7/2013 | Whitten et al. | 312/223.1 |

* cited by examiner

*Primary Examiner* — Bradley Duckworth
(74) *Attorney, Agent, or Firm* — Vic Y. Lin; Innovation Capital Law Group, LLP (57) ABSTRACT

An apparatus for holding an electronic device, such as a smartphone or GPS device, is configured to secure the device within and without an automobile. The apparatus includes a handle grip assembly and a detachable clamp assembly. The clamp assembly may be configured with removable vent connectors to facilitate attachment of the clamp assembly to a standard air conditioning vent of the automobile. With the vent connectors removed, the clamp assembly may be coupled to a grip backing plate to form a tripod structure. A pair of legs swivel in and out of cradles formed in a handle assembly where an ergonomic handle serves as the third leg of the tripod.

20 Claims, 8 Drawing Sheets

ELECTRONIC GADGET HOLDER FOR AUTOMOBILES AND TRIPODS

BACKGROUND OF THE INVENTION

1. Field of the Invention

This invention relates to holders for smartphones, digital cameras, GPS devices, and other electronic devices or gadgets that feature visual displays.

2. Description of Prior Art and Related Information

Smartphones and tablet computers now commonly come with built-in GPS functionality. The increasing number of mobile applications ("apps") providing location-based services creates a need for users to run and see these apps while driving an automobile. For example, a user may operate a smartphone as a GPS device and desire the smartphone to be in a safe, front view while driving.

Those smartphones and tablet computers also come with built-in camera functionality, making it desirable to mount such devices on tripods in order to snap photographs.

BRIEF SUMMARY OF THE INVENTION

In accordance with the present invention, structures and associated methods are disclosed which address these needs and overcome the deficiencies of the prior art.

In one aspect, an apparatus is provided for holding a handheld electronic device having a display. The apparatus preferably comprises a clamp assembly configured to detachably secure the electronic device. A vent connector is configured to removably couple the clamp holder to an automobile air conditioning vent. A tripod connector is configured to removably couple the clamp holder to a tripod.

The clamp assembly comprises a clamp base coupled to a device clamp. The device clamp comprises a first side configured to detachably secure the device, and an opposite second side configured to be coupled to the clamp base. The vent connector comprises a vent prong protruding out from the clamp base away from the clamp holder. The vent connector is detachable from the clamp base. The tripod connector comprises a locking screw having external threads and an internally threaded hole defined in the clamp holder and configured to mate with the locking screw.

The apparatus further comprises a tripod assembly including a tripod base plate coupled to a first leg, a second leg and a third leg. The locking screw removably secures the tripod base plate to the clamp base. The third leg preferably comprises a hand grip. The first leg comprises a first swivel tripod leg pivotally coupled to the hand grip, and nested within a first cradle. The second leg comprises a second swivel tripod leg pivotally coupled to the hand grip and nested within a second cradle. The tripod base plate is rotatable with respect to the hand grip to facilitate angling the device upward or downward. The apparatus further comprises a slide mechanism to vary distance between a first prong on a first prong side and a second prong on a second prong side. The device clamp is rotatable with respect to the clamp base to facilitate either a vertical orientation or a horizontal orientation of the device.

In a further aspect, an apparatus for holding a handheld electronic device having a display comprises a device clamp, a removable vent connector and a clamp base. The device clamp has a first side configured to detachably secure the electronic device and an opposite second side. The clamp base is coupled to the second side of the device clamp. The vent connector comprises a vent prong protruding out from the clamp base away from the clamp holder. The vent connector is detachably coupled to the clamp base and configured to removably connect to an automobile air conditioning vent. An internally threaded mount hole is defined in the clamp base and configured to receive an externally threaded locking screw.

The locking screw preferably comprises a distal portion having external threads and defining an diameter of 0.25 inch. The internally threaded mount hole preferably defines an internal diameter of 0.25 inch. The apparatus further comprises a tripod assembly including a tripod base plate coupled to a first leg, a second leg and a third leg which may comprise a hand grip. The locking screw removably secures the tripod base plate to the clamp base. The first leg comprises a first swivel tripod leg pivotally coupled to the hand grip and nested within a first cradle defined in the hand grip. The second leg comprises a second swivel tripod leg pivotally coupled to the hand grip and nested within a second cradle. The tripod base plate is rotatable with respect to the hand grip to facilitate angling the device upward or downward. The device clamp is rotatable with respect to the clamp base to facilitate either a vertical orientation or a horizontal orientation of the device.

In a further aspect, an apparatus for holding a handheld electronic device having a display comprises a device clamp having a front side configured to detachably secure the electronic device and a rear side. A clamp base is coupled to the rear side of the clamp holder. A vent connector comprises a vent prong protruding out from the clamp base away from the device clamp. The vent connector is detachably coupled to the clamp base and configured to removably attach to an automobile air conditioning vent. An internally threaded mount hole is defined in the clamp base. A tripod assembly comprises a tripod base plate coupled to a first leg, a second leg and a third leg, which may comprise a hand grip. A locking screw removably secures the tripod base plate to the clamp base. The internally threaded mount hole is configured to receive the locking screw.

The first leg comprises a first swivel tripod leg pivotally coupled to the hand grip and nested within a first cradle. The second leg comprises a second swivel tripod leg pivotally coupled to the hand grip and nested within a second cradle. The locking screw preferably comprises a distal portion having external threads and defining an diameter of 0.25 inch. The internally threaded mount hole preferably defines an internal diameter of 0.25 inch. The tripod base plate is rotatable with respect to the hand grip to facilitate angling the device upward or downward. The device clamp is rotatable with respect to the clamp base to facilitate either a vertical orientation or a horizontal orientation of the device.

The various embodiments of the invention can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS

Figure 1:
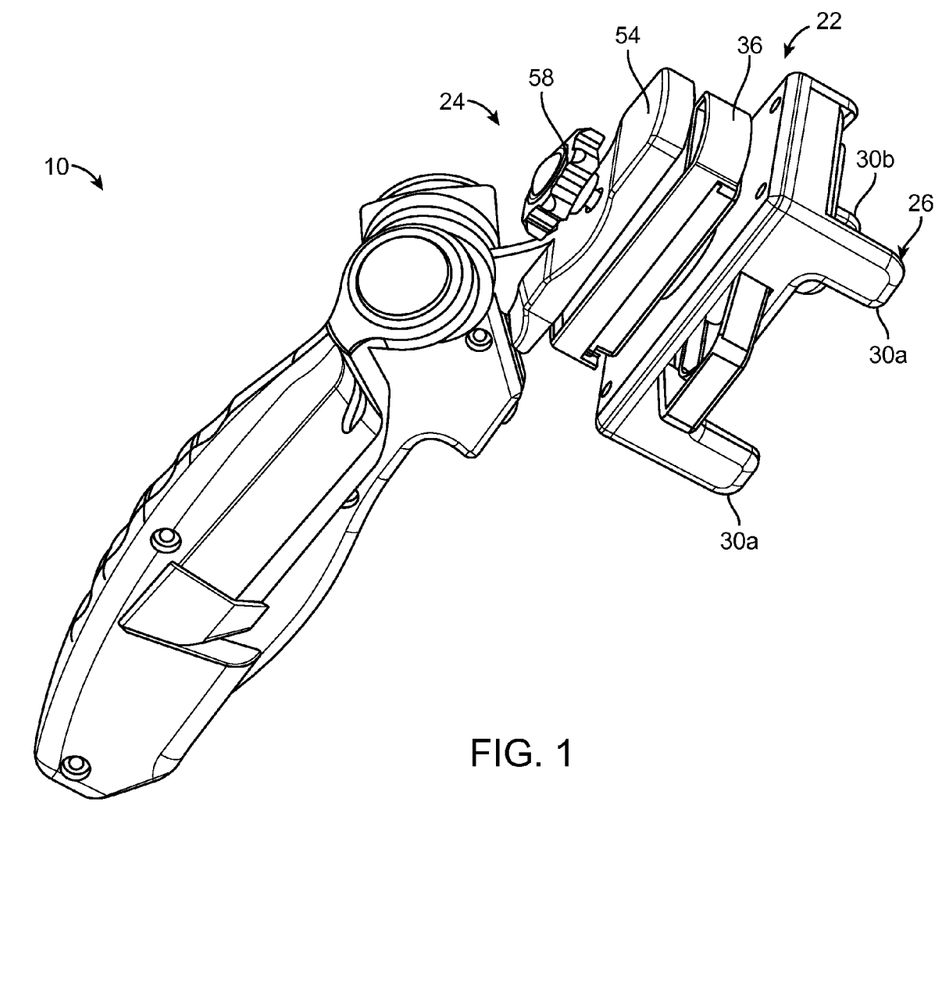
FIG. 1 is perspective view a preferred embodiment of an apparatus for holding an electronic device having a visual display.
Figure 2:
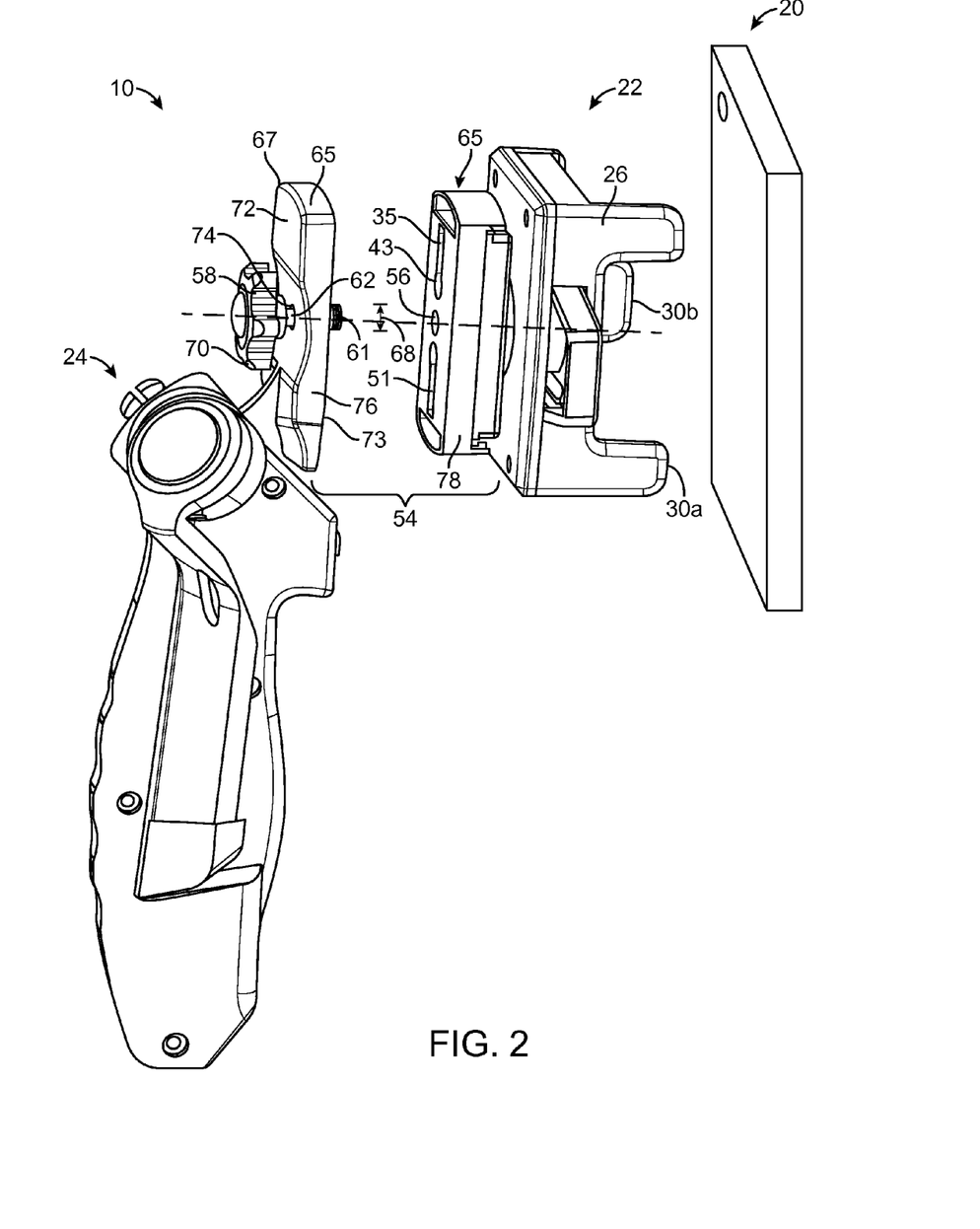
FIG. 2 is an exploded. perspective view of the apparatus for holding an electronic device.

In a preferred embodiment shown in FIGS. 1 and 2, an apparatus 10 is provided for holding an electronic device 20 having a visual display. More specifically, the apparatus 10 is preferably configured to hold an electronic device that may be used within and without an automobile. Such a device 20 may comprise a smartphone, GPS device, digital camera, tablet computer, electronic book readers or other devices incorporating two or more of these functionalities. The apparatus 10 comprises a clamp holder assembly, or simply clamp assembly, 22 and a tripod, or grip, assembly 24 removably coupled to each other. The clamp assembly 22 is configured to hold an electronic device 20 and to removably connect to the tripod assembly 24 such that the electronic device held by clamp assembly 22, may be removed from the tripod assembly 24 and attached to the air conditioning vent of an automobile.

In the preferred embodiment shown in FIGS. 1 and 2, the clamp assembly 22 comprises a device clamp, or clamp holder, 26 and a clamp base 36 coupled to a rear side 34 of the device clamp 26. The device clamp 26 has a generally flat front platform 28 and one or more prongs 30 protruding forwardly for holding a handheld electronic device 20, such as a smartphone, for example. The platform 28 and prongs 30 are positioned on a front side 32 of the device clamp 26.

Figure 5:
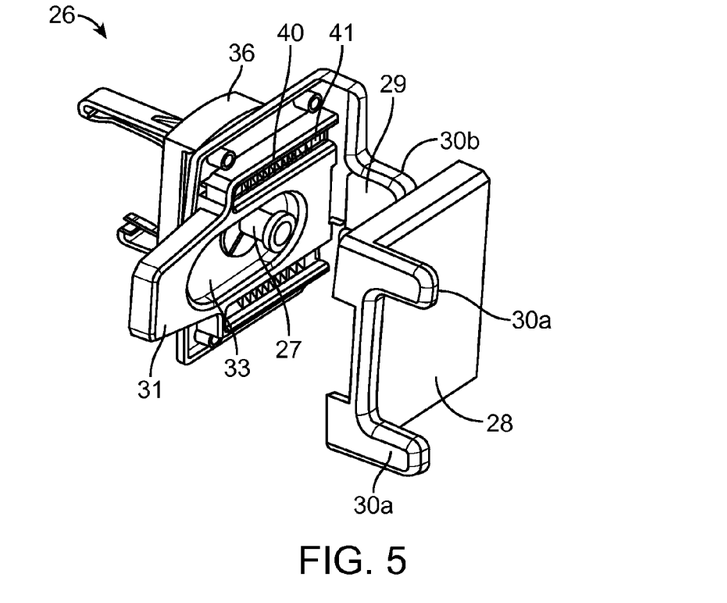
FIG. 5 is a front, exploded view of the preferred clamp holder base plate.

In the preferred embodiment as shown in FIG. 5, a pair of prongs 30a is formed on one peripheral side of the device clamp 26 while a third prong 30b is formed on an opposite peripheral side and coupled to a slider 31 which is spring biased towards the pair of prongs 30a. A cushion pad 29 may be disposed on an interior side of each prong 30a, 30b to facilitate a more secure grip and to prevent scratching the device. In the preferred embodiment, the preferred minimum distance between the two sets of prongs is 2 inches. The third prong 30b may be moved away from the first set of prongs 30a up to a distance of 3.5 inches or more to accommodate a larger device. The slider 31 comprises an elongate opening 33 to receive a post 27 and enable movement along the length of the opening 33. The device clamp 26 comprises a pair of coil springs 40, each disposed in a corresponding channel 41.

Figure 3:
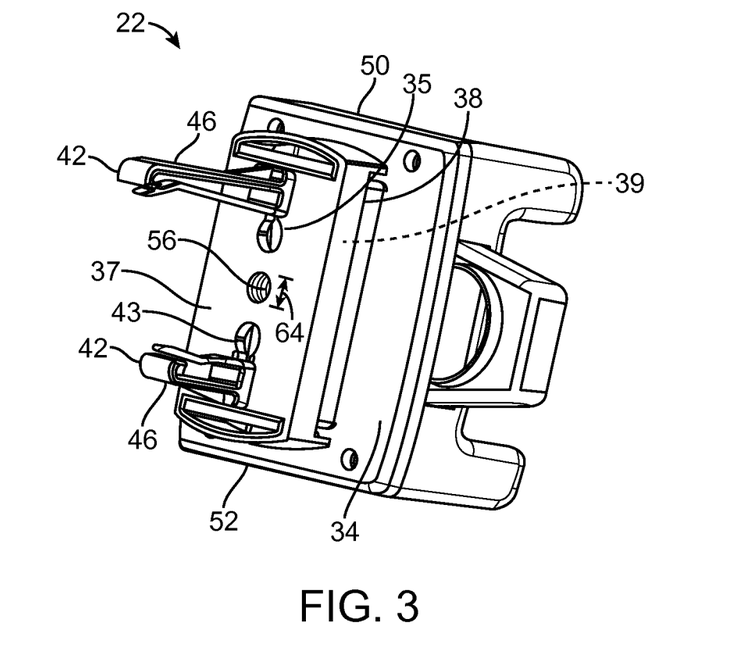
FIG. 3 is a rear perspective view of a preferred clamp holder base plate.
Figure 4:
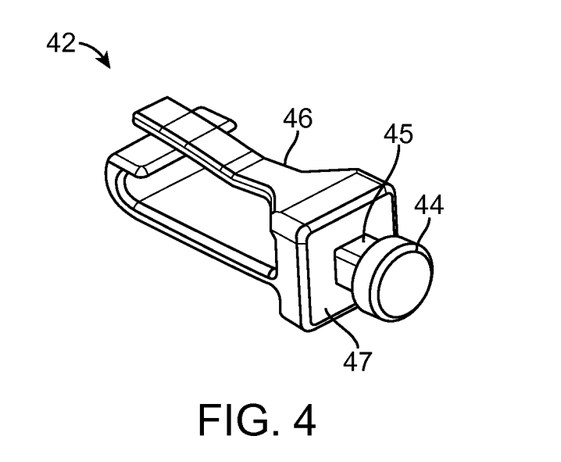
FIG. 4 is a perspective view of a preferred vent connector.

FIG. 3 illustrates a preferred embodiment of the clamp assembly 22. The clamp base 36 includes a cover 37 and walls 38 that protrude from the clamp rear surface 34, thereby defining an interior space 39 therein. The cover 37 comprises two vent slots 35. As shown more clearly in FIG. 2, each vent slot 35 includes a medial, enlarged circular opening 43 that is contiguous with a slender channel 51 leading to an outer end of the clamp base 36. Thus, each vent slot 35 is preferably shaped as a key hole. In the preferred embodiment shown in FIG. 3, a vent connector 42 is removably coupled to the clamp base 36. In FIG. 4, the vent connector 42 comprises a vent knob 44 and an air vent clip 46 configured to removably connect to standard automobile air-conditioning vents. A narrow shaft 45 extends between the vent knob and a rectangular vent base 47. When assembled, the vent knob 44 is initially inserted into an enlarged opening 49 formed in the cover 37. Once inserted, the vent connector 42 is then slid along a narrow slot, or channel, 51 towards disposed within the housing 38 while the clip 46 protrudes away from the device clamp 26

In the preferred embodiment as shown in FIG. 3, the apparatus 10 comprises two vent connectors 42, positioned adjacent to a top 50 and bottom 52 of the clamp base plate 36, to provide a more stable connection to the automobile A/C vent. Thus, the clamp base 36 preferably comprises top and bottom vent slots, or vent holes, 35, where each vent connector 42 protrudes out from a corresponding vent hole 35.

Referring back to FIG. 2, the apparatus 10 also comprises a tripod connector 54 that facilitates a detachable connection of the device clamp 26 to the tripod assembly 24. In the preferred embodiment, the tripod connector 54 comprises an internally threaded mounting hole 56 defined in the clamp base 36 and an externally threaded locking screw 58 configured to mate with the mounting hole 56. In the preferred embodiment, the locking screw 58 comprises external threads 61 formed on a shaft 62 having 0.25 inch external diameter "E", in accordance with standard tripod mounting screws. Accordingly, the mounting hole 56 defines an internal diameter 64, shown in FIG. 3, that conforms to the external diameter 68, shown in FIG. 2, of the locking screw 58. The mounting hole 56 comprises internal threads 63 having a pitch configured to mate with that of the external threads 61 of the locking screw 58.

In FIG. 2, the locking screw 58 is supported or carried by a tripod base plate 65 located at a top end 67 of the tripod assembly 24. In the preferred embodiment, the locking screw 58 comprises a knob 70 disposed adjacent to a rear side 72 of the tripod base plate 65. The locking screw shaft 62 extends from the knob 70 through an opening 74 defined in the tripod base plate 65, and past a front side 73 of the tripod base plate 65. In the preferred embodiment, the tripod base plate 65 comprises a periphery, or border, 76 that substantially conforms to a periphery, or border, 78 of the clamp base plate 36. The tripod base plate opening 74 is configured to be aligned with the mount hole 56 in the clamp base plate 36 such that when the locking screw 58 mates with the mount hole 56, the tripod base plate 65 is securely, but detachably, coupled to the clamp base plate 36 in such a manner that the respective peripheries 76, 78 are aligned.

Figure 6:
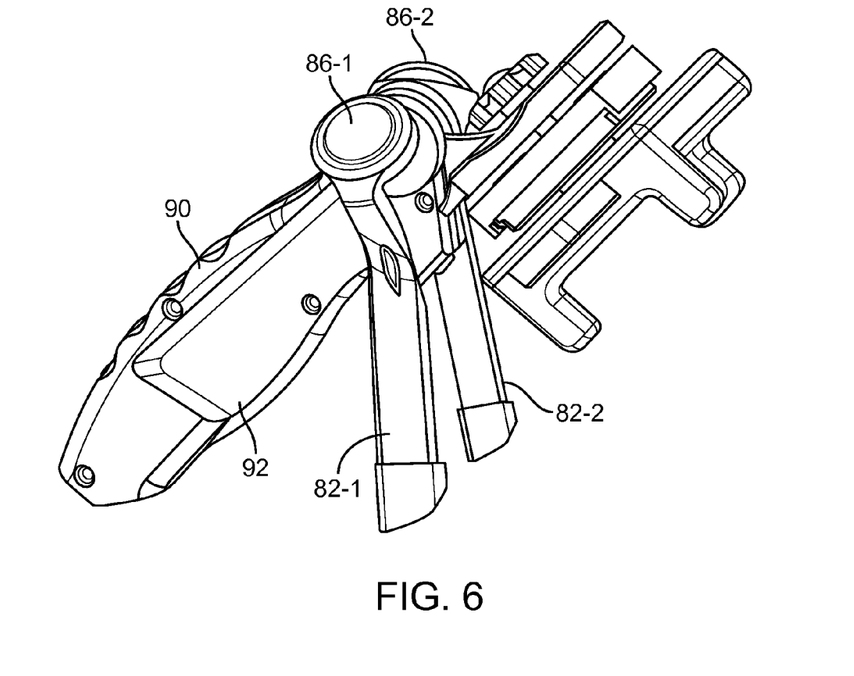
FIG. 6 is a perspective view of the holding apparatus operating as a tripod.

In FIG. 6, the tripod assembly 24 comprises a first leg 82-1 and a second leg 82-2, each coupled to a respective swivel 86-1, 86-2. An ergonomic hand grip 90 comprises the third leg 90, which is formed along a centerline between the two swivel legs 82-1, 82-2. In the preferred embodiment, each swivel leg 82-1, 82-2 nests within a corresponding cradle 92 defined in the hand grip 90. Each swivel leg 82-1, 82-2 is configured to pivot away from the pair of cradles 92 in the hand grip 90 and to spread radially away from each other so as to form a stable tripod structure for supporting the electronic device, particularly when the device is functioning as a camera to take photographs or videos.

Figure 7:
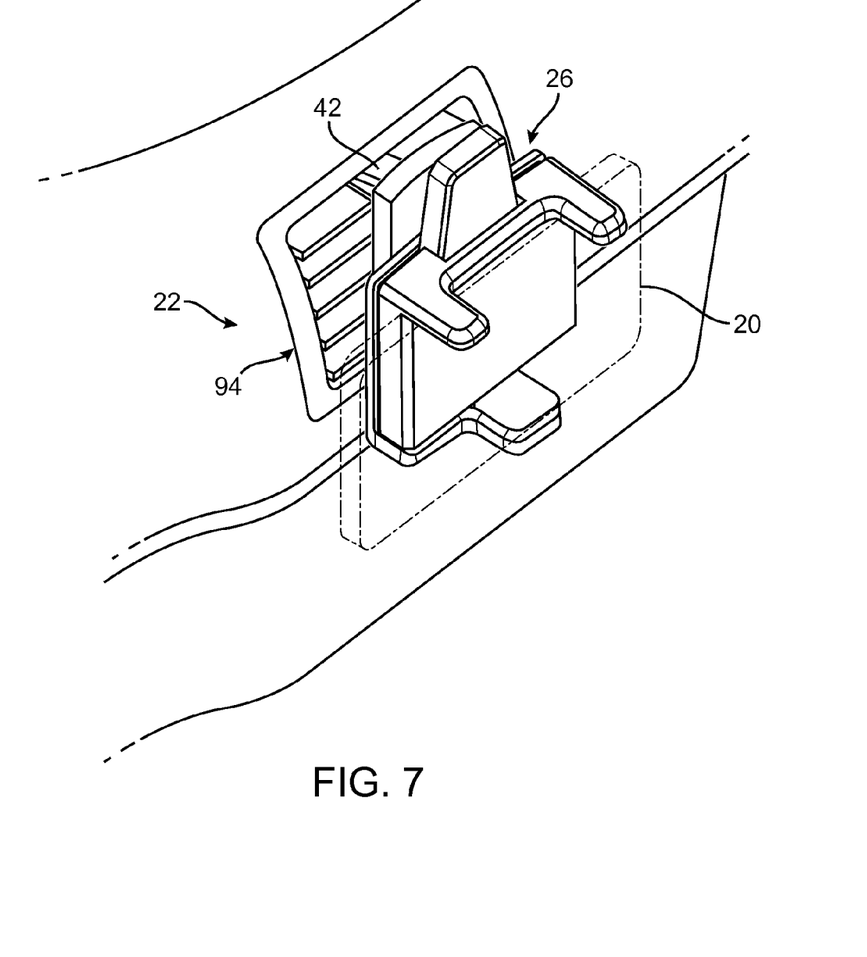
FIG. 7 shows the preferred clamp holder assembly holding an electronic device and operating in connection with an automobile air-conditioning vent.

With the structure of the preferred apparatus 10 having been described, turn now to its operation. FIG. 7 shows the clamp holder assembly 22 in its automobile mode where the electronic device 20 may be positioned adjacent to the air conditioning vent 94 of any automobile. The preferred device clamp 26 is shown holding the electronic device 20 with the visual display facing away from the clamp. As an example and not by way of limitation, the electronic device 20 may comprise a smartphone. A pair of vent connectors 42 is employed in the preferred embodiment to provide a more stable, but detachable connection to the air conditioning event. As shown in FIGS. 3 and 4, each vent connector 42 has a vent base 44 disposed in the space 39 within the housing 38, secures the clamp holder assembly to the vent by way of each vent clip 46 protruding out from a vent hole 48 away from the device clamp 26. The user may simply pull the entire assembly 22 away from the automobile vent to detach the clamp holder assembly 22 therefrom. To enable the clamp holder assembly 22 to be secured the tripod assembly 24, the vent connectors 24 are removed from the device clamp 26.

Figure 8:
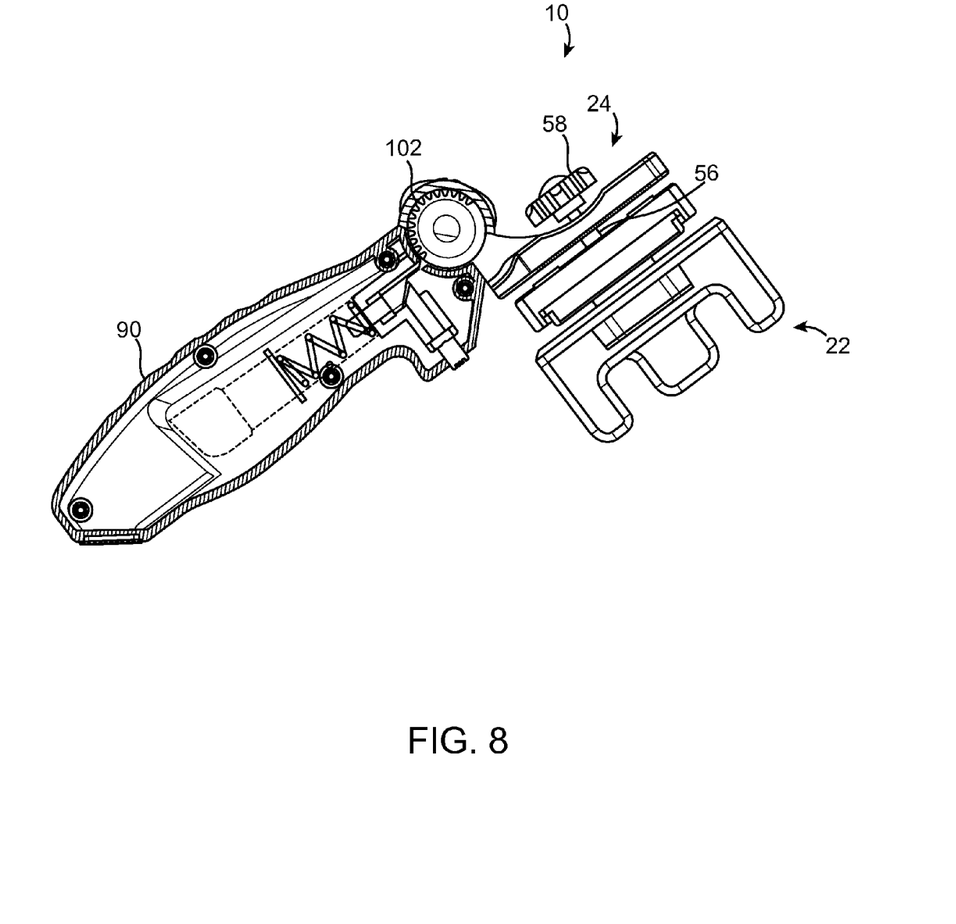
FIG. 8 is a right side view of the preferred embodiment of the holder apparatus with certain portions removed for clarity.
Figure 9:
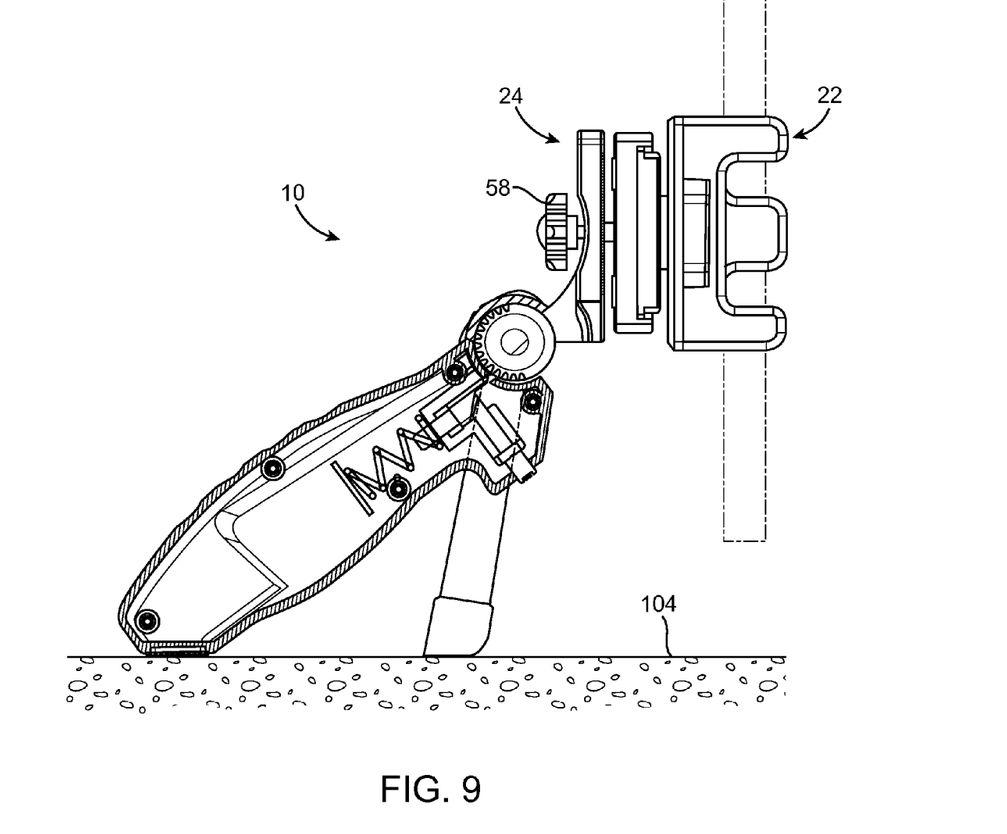
FIG. 9 is a right side operative view of preferred embodiment of the holder apparatus in tripod mode, with certain portions removed for clarity.

FIGS. 8 and 9 show the preferred apparatus 10 in its tripod mode. In FIGS. 8 and 9, the locking screw 58 mates with the mounting hole 56 to secure the clamp holder assembly 22 to the tripod assembly 24. A grip tilt locking gear 102 enables the clamp holder assembly 22 and tripod assembly 24 to rotate about the grip 90. This enables the user to adjust the viewing angle upwards or downwards as desired to facilitate the device taking photographs and/or videos once the tripod is stabilized on a generally horizontal surface 104. For example, in FIG. 9, each leg 82 is pivoted out from its cradle 92

Figure 10:
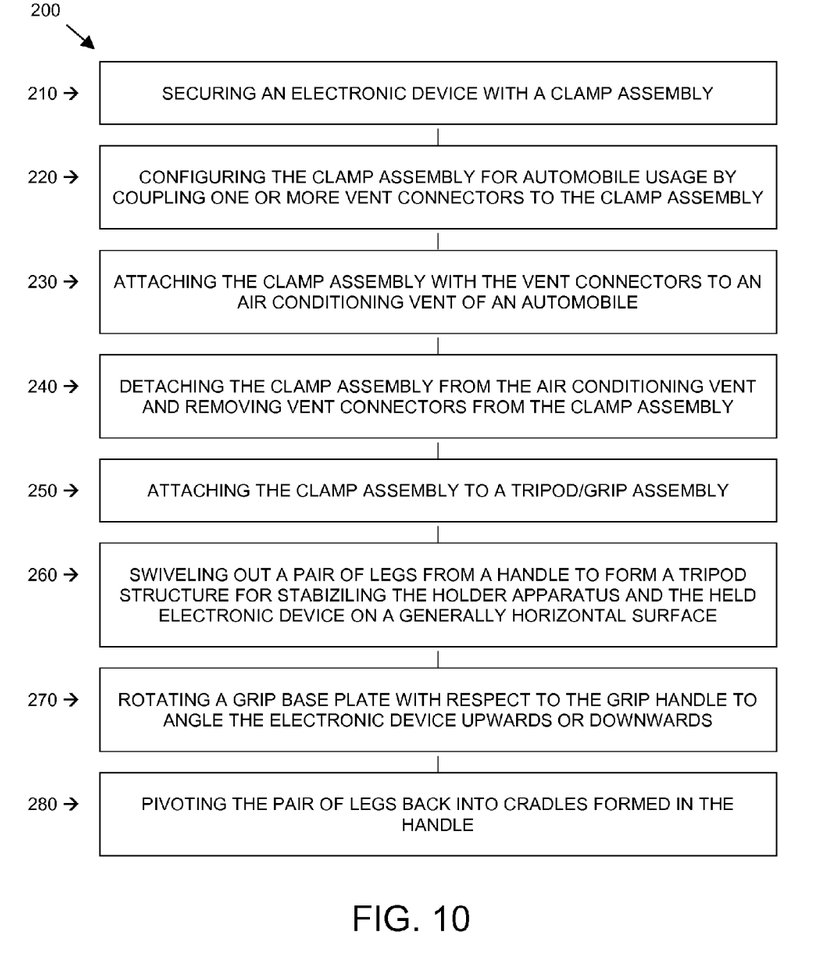
FIG. 10 illustrates a preferred method for interchangeably securing an electronic device to an automobile AC vent or to a tripod structure.

FIG. 10 illustrates a preferred method 200 for holding an electronic device within and without an automobile. In particular, method 200 comprises a preferred method for interchangeably securing an electronic device to an automobile air conditioning vent or to a tripod structure. Step 210 comprises securing an electronic device with a clamp assembly. Step 210 comprises adjusting a spring-biased slider in order to vary the spacing between prongs so as to accommodate the particular size of the device. In step 210, a visual display of the electronic device is positioned to face outward (i.e., away from the clamp assembly). Step 210 may include the option to rotate the prongs, and thus the held device, respect to a back plate in order to facilitate either a vertical or horizontal orientation.

Step 220 comprises configuring the clamp assembly for automobile usage, or setting up the automobile mode of the preferred holder apparatus. In step 220, preferably two vent connectors are coupled to the clamp assembly, with the vent prongs protruding out the rear side of the clamp assembly.

Step 230 comprises attaching the clamp assembly with the vent connectors to an air conditioning vent ("AC vent") of an automobile. Step 230 preferably comprises a detachable connection to the AC vent.

Step 240 comprises detaching the clamp assembly from the AC vent. Afterwards, the vent connectors are removed from the clamp assembly in step 240.

Step 250 comprises attaching the clamp assembly to a tripod, or grip, assembly which includes a pair of swivel legs and an ergonomic handle that serves as the third leg. Step 260 comprises swiveling, or pivoting, the pair of legs away from the handle to form a tripod structure for stabilizing the holder apparatus, and thus the held electronic device, on a generally horizontal surface. Step 270 comprises rotating a grip base plate with respect to the grip handle to angle the electronic device upwards or downwards. Step 270 thus enables the user to position the electronic device for the optimum angle in taking pictures or videos. Step 280 comprises pivoting the pair of legs back into cradles formed in the handle.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what incorporates the essential idea of the invention.

What is claimed is:

1. An apparatus for holding a handheld electronic device having a display, comprising:
    a clamp assembly comprising a clamp holder configured to detachably secure the electronic device;
    a vent connector configured to removably couple the clamp holder to an automobile air conditioning vent; and
    a tripod connector configured to removably couple the clamp holder to a tripod,
    wherein the clamp holder is configured to be alternately and removably coupled to the vent connector or the tripod connector.

2. The apparatus of claim 1, where in the clamp assembly comprises a clamp base coupled to the clamp holder, wherein:
    the clamp holder comprises a first side configured to detachably secure the device, and an opposite second side configured to be coupled to the clamp base;
    the vent connector comprises a vent prong protruding out from the clamp base away from the clamp holder, the vent connector being detachable from the clamp base; and
    the tripod connector comprises a locking screw having external threads and an internally threaded hole defined in the clamp holder and configured to mate with the locking screw.

3. The apparatus of claim 2, further comprising:
    a tripod assembly including a tripod base plate coupled to a first leg, a second leg and a third leg,
    wherein the locking screw removably secures the tripod base plate to the clamp base.

4. The apparatus of claim 3, wherein:
the third leg comprises a hand grip;
the first leg comprises a first swivel tripod leg pivotally coupled to the hand grip; and
the second leg comprises a second swivel tripod leg pivotally coupled to the hand grip.

5. The apparatus of claim 4, wherein the tripod base plate is rotatable with respect to the hand grip to facilitate angling the device upward or downward.

6. The apparatus of claim 1, further comprising a slide mechanism to vary distance between a first prong on a first prong side and a second prong on a second prong side.

7. The apparatus of claim 1, wherein the device clamp is rotatable with respect to the clamp base to facilitate either a vertical orientation or a horizontal orientation of the device.

8. An apparatus for holding a handheld electronic device having a display, comprising:
a device clamp having a first side configured to detachably secure the electronic device and an opposite second side;
a clamp base coupled to the second side of the device clamp, the clamp base defining an internally threaded mount hole;
a vent connector comprising a vent prong protruding out from the clamp base away from the device clamp, the vent connector being detachably coupled to the clamp base and being configured to removably connect to an automobile air conditioning vent; and
an externally threaded locking screw, wherein the internally threaded mount hole is configured to receive the locking screw; and
a tripod assembly including a tripod base plate, wherein the locking screw removably secures the tripod base plate to the clamp base,
wherein the device clamp is configured to be alternately and removably coupled to the vent connector or the tripod assembly.

9. The apparatus of claim 8, wherein:
the locking screw comprises a distal portion having external threads and defining an diameter of 0.25 inch; and
the internally threaded mount hole defines an internal diameter of 0.25 inch.

10. The apparatus of claim 8, wherein the tripod base plate is coupled to a first leg, a second leg and a third leg.

11. The apparatus of claim 10, wherein:
the third leg comprises a hand grip;
the first leg comprises a first swivel tripod leg pivotally coupled to the hand grip; and
the second leg comprises a second swivel tripod leg pivotally coupled to the hand grip.

12. The apparatus of claim 11, wherein the tripod base plate is rotatable with respect to the hand grip to facilitate angling the device upward or downward.

13. The apparatus of claim 8, wherein the device clamp is rotatable with respect to the clamp base to facilitate either a vertical orientation or a horizontal orientation of the device.

14. The apparatus of claim 8, wherein the device clamp comprises at least two prongs.

15. An apparatus for holding a handheld electronic device having a display, comprising:
a device clamp having a front side configured to detachably secure the electronic device and a rear side;
a clamp base coupled to the rear side of the clamp holder;
a vent connector comprising a vent prong protruding out from the clamp base away from the device clamp, the vent connector being detachably coupled to the clamp base and being configured to removably attach to an automobile air conditioning vent;
an internally threaded mount hole defined in the clamp base;
a tripod assembly comprising a tripod base plate coupled to a first leg, a second leg and a third leg; and
a locking screw removably securing the tripod base plate to the clamp base,
wherein the internally threaded mount hole is configured to receive the locking screw,
wherein the clamp holder is configured to be alternately and removably coupled to the vent connector or the tripod assembly.

16. The apparatus of claim 15, wherein:
the third leg comprises a hand grip;
the first leg comprises a first swivel tripod leg pivotally coupled to the hand grip; and
the second leg comprises a second swivel tripod leg pivotally coupled to the hand grip.

17. The apparatus of claim 15, wherein:
the locking screw comprises a distal portion having external threads and defining an diameter of 0.25 inch; and
the internally threaded mount hole defines an internal diameter of 0.25 inch.

18. The apparatus of claim 15, wherein the tripod base plate is rotatable with respect to the hand grip to facilitate angling the device upward or downward.

19. The apparatus of claim 15, wherein the device clamp is rotatable with respect to the clamp base to facilitate either a vertical orientation or a horizontal orientation of the device.

20. The apparatus of claim 15, wherein the device clamp comprises at least two prongs.

\* \* \* \* \*